United States Patent
Tabayashi et al.

(10) Patent No.: US 11,988,950 B2
(45) Date of Patent: May 21, 2024

(54) WAVELENGTH CONVERSION DEVICE, LIGHT SOURCE DEVICE, AND PROJECTOR

(71) Applicant: SEIKO EPSON CORPORATION, Tokyo (JP)

(72) Inventors: Kosuke Tabayashi, Matsumoto (JP); Norikazu Kadotani, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/830,704

(22) Filed: Jun. 2, 2022

(65) Prior Publication Data
US 2022/0390822 A1    Dec. 8, 2022

(30) Foreign Application Priority Data

Jun. 2, 2021   (JP) ................ 2021-092767

(51) Int. Cl.
  *G03B 21/20*    (2006.01)
  *G02B 26/00*    (2006.01)
  *G03B 21/16*    (2006.01)

(52) U.S. Cl.
  CPC ......... *G03B 21/204* (2013.01); *G02B 26/008* (2013.01); *G03B 21/16* (2013.01)

(58) Field of Classification Search
  CPC ..... G03B 21/204; G03B 21/16; G02B 26/008
  See application file for complete search history.

(56) References Cited

U.S. PATENT DOCUMENTS

| | | | |
|---|---|---|---|
| 2016/0077326 A1 | 3/2016 | Yamagishi et al. | |
| 2016/0363294 A1* | 12/2016 | Yu | F21S 41/16 |
| 2017/0099467 A1* | 4/2017 | Egawa | H04N 9/3144 |
| 2017/0175989 A1* | 6/2017 | Yamagishi | G03B 21/16 |
| 2017/0244939 A1* | 8/2017 | Arakawa | H04N 9/3158 |
| 2017/0261844 A1 | 9/2017 | Kitade et al. | |
| 2018/0173086 A1 | 6/2018 | Noda | |
| 2019/0094671 A1* | 3/2019 | Ikeo | G02B 26/008 |
| 2019/0146314 A1* | 5/2019 | Yoshikawa | G03B 21/204 362/84 |
| 2020/0089092 A1* | 3/2020 | Yamagishi | F21V 29/505 |
| 2020/0310233 A1* | 10/2020 | Kadotani | H05K 7/20327 |

FOREIGN PATENT DOCUMENTS

| | | |
|---|---|---|
| JP | 2016-066061 A | 4/2016 |
| JP | 2018-101089 A | 6/2018 |
| JP | 2020-201387 A | 12/2020 |
| WO | WO2017/154048 A | 9/2017 |

* cited by examiner

*Primary Examiner* — Magda Cruz
(74) *Attorney, Agent, or Firm* — Dority & Manning, P.A.

(57) ABSTRACT

A wavelength conversion device according to the present disclosure includes a wheel substrate, a phosphor layer formed on the wheel substrate, and a cooling fin unit disposed on the wheel substrate. The cooling fin unit has a base part to be bonded to the wheel substrate. A surface of the wheel substrate includes a first area corresponding to the phosphor layer, and a second area located closer to the central axis than the first area, the surface of the wheel substrate and a surface at the wheel substrate side of the base part are separated from each other to form a space between the wheel substrate and the base part, and a coupling part configured to thermally couple the surface of the wheel substrate and the surface at the wheel substrate side of the base part is disposed in at least the second area of the second surface.

20 Claims, 10 Drawing Sheets

WAVELENGTH CONVERSION DEVICE, LIGHT SOURCE DEVICE, AND PROJECTOR

The present application is based on, and claims priority from JP Application Serial Number 2021-092767, filed Jun. 2, 2021, the disclosure of which is hereby incorporated by reference herein in its entirety.

BACKGROUND

1. Technical Field

The present disclosure relates to a wavelength conversion device, a light source device, and a projector.

2. Related Art

In recent years, regarding a light source device to be used for a projector, there has been a technology of irradiating a phosphor layer with excitation light emitted from a laser source, and using fluorescence obtained by wavelength conversion in the phosphor layer as illumination light. Although it becomes necessary to make the laser source high in power in order to generate the illumination light high in luminance, when raising the output of the excitation light with which the phosphor layer is irradiated, a wavelength conversion efficiency of the phosphor layer decreases due to a rise in temperature.

Therefore, as disclosed in JP-A-2020-201387 (Document 1) and JP-A-2016-66061 (Document 2), a phosphor wheel obtained by providing a phosphor layer to a rotatable wheel is used, and thus, it is arranged to increase the wavelength conversion efficiency by cooling the phosphor layer with a rotation of the phosphor wheel.

In the light source device disclosed in Document 1 described above, there is formed a space in which a wheel substrate is sealed, and by propagating the heat to radiator fins of a chassis arranged so as to be opposed to radiator fins of the wheel substrate via the space, the heat is released from the phosphor layer.

Further, in a light source device disclosed in Document 2 described above, radiation fins are disposed at an inner side of a forming area of the phosphor on a reverse surface opposite to an obverse surface of the wheel substrate provided with the phosphor layer, and thus, the radiator fins are rotated together with the wheel substrate to thereby feed air to the formation area of the phosphor layer with the radiator fins to release the heat from the phosphor layer.

However, in the light source device disclosed in Document 1 described above, when propagating the heat to the radiator fins at the chassis side via the space, it is difficult to sufficiently release the heat from the phosphor layer due to the structure in which the radiator fins at the chassis side do not rotate.

Further, in the light source device disclosed in Document 2 described above, since the heat of the phosphor layer concentrates at an outer side of the radiator fins, there occurs a necessity of increasing a rotational frequency of the radiator fins for obtaining a sufficient cooling performance, and thus, there arises a problem that a drive source for rotating the wheel substrate grows in size to thereby grow the configuration in size.

Further, when making the laser source high in power in order to generate the illumination light higher in luminance, it is conceivable that the radiator fins are grown in size in order to enhance the cooling performance of the phosphor layer. However, when growing the radiator fins in size, since the weight of the radiator fins increases, it becomes necessary to adopt a drive source large in size as the drive source for rotating the phosphor wheel, and thus, there arises a problem such as a growth in size and an increase in weight of the device configuration.

Therefore, there is desired the provision of a new technology capable of suppressing the growth in size of the device configuration, and at the same time, capable of efficiently cooling the phosphor layer to thereby increase the wavelength conversion efficiency of the phosphor layer, and thus, generating fluorescence high in luminance.

SUMMARY

In view of the problems described above, according to a first aspect of the present disclosure, a wavelength conversion device includes a rotary drive section, a wheel substrate having thermal conductivity and rotated around a central axis by the rotary drive section, a phosphor layer formed around the central axis on a first surface of the wheel substrate, and a cooling fin unit disposed on a second surface opposite to the first surface of the wheel substrate.

The cooling fin unit has a base part to be bonded to the wheel substrate, and a plurality of radiator fins disposed at an opposite side to the wheel substrate side of the base part. The second surface of the wheel substrate includes a first area corresponding to the phosphor layer, and a second area located closer to the central axis than the first area. The second surface of the wheel substrate and a surface at the wheel substrate side of the base part are separated from each other to form a space between the wheel substrate and the base part. A coupling part configured to thermally couple the second surface of the wheel substrate and the surface at the wheel substrate side of the base part is disposed in at least the second area of the second surface.

According to a second aspect of the present disclosure, a light source device includes the wavelength conversion device according to the aspect described above, and an excitation light source configured to emit excitation light toward the wavelength conversion device.

According to a third aspect of the present disclosure, a projector includes the light source device according to the aspect described above, a light modulation device configured to modulate light from the light source device in accordance with image information, and a projection optical device configured to project the light modulated by the light modulation device.

DESCRIPTION OF EXEMPLARY EMBODIMENTS

Some embodiments of the present disclosure will hereinafter be described in detail with reference to the drawings.

It should be noted that the drawings used in the following description show characteristic parts in an enlarged manner in some cases for the sake of convenience in order to make the features easy to understand, and the dimensional ratios between the constituents and so on are not necessarily the same as actual ones.

First Embodiment

Figure 1:
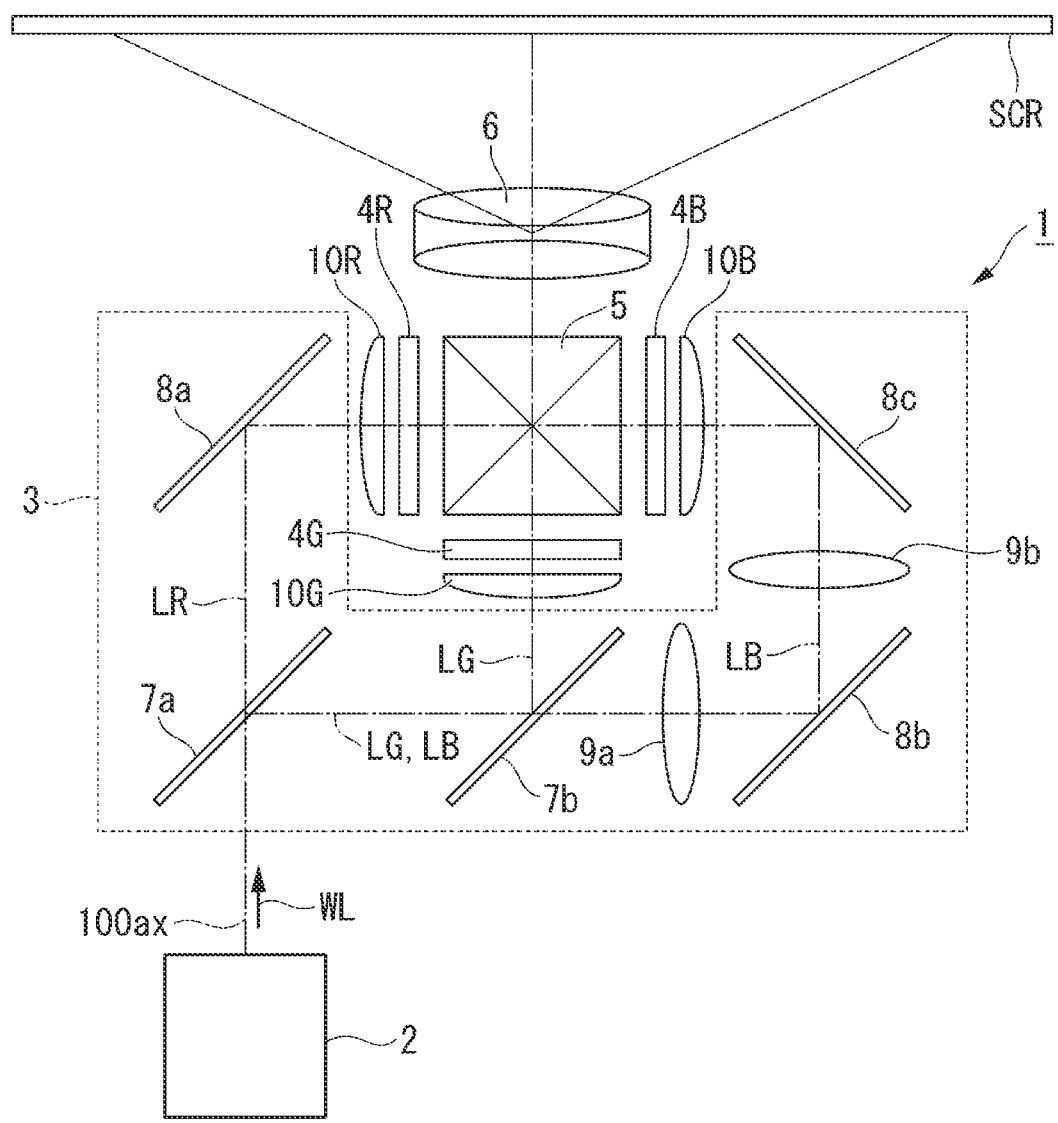
FIG. 1 is a schematic configuration diagram of a projector according to an embodiment.

FIG. 1 is a schematic configuration diagram of a projector according to the present embodiment.

As shown in FIG. 1, the projector 1 according to the present embodiment is a projection-type image display device for displaying an image on a screen SCR. The projector 1 is provided with a light source device 2, a color separation optical system 3, a light modulation device 4R, a light modulation device 4G, a light modulation device 4B, a combining optical system 5, and a projection optical device 6.

The light source device 2 emits illumination light WL having a white color toward the color separation optical system 3. The configuration of the light source device 2 will be described later in detail.

The color separation optical system 3 separates the illumination light WL having been emitted from the light source device 2 into red light LR, green light LG, and blue light LB. The color separation optical system 3 is provided with a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a separates the illumination light WL from the light source device 2 into the red light LR, and light including the green light LG and the blue light LB. The first dichroic mirror 7a transmits the red light LR, and at the same time, reflects the green light LG and the blue light LB. Meanwhile, the second dichroic mirror 7b reflects the green light LG and at the same time transmits the blue light LB. Thus, the second dichroic mirror 7b separates the light including the green light LG and the blue light LB into the green light LG and the blue light LB.

The first total reflection mirror 8a is disposed in the light path of the red light LR, and the red light LR which has been transmitted through the first dichroic mirror 7a is reflected by the first total reflection mirror 8a toward the light modulation device 4R. Meanwhile, the second total reflection mirror 8b and the third total reflection mirror 8c are disposed in the light path of the blue light LB, and the blue light LB which has been transmitted through the second dichroic mirror 7b is guided by the second total reflection mirror 8b and the third total reflection mirror 8c to the light modulation device 4B. The green light LG is reflected by the second dichroic mirror 7b toward the light modulation device 4G.

The first relay lens 9a and the second relay lens 9b are disposed at a light incident side and a light exit side of the second total reflection mirror 8b in the light path of the blue light LB. The first relay lens 9a and the second relay lens 9b compensate a light loss of the blue light LB caused by the fact that the optical path length of the blue light LB becomes longer than the optical path lengths of the red light LR and the green light LG.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As each of the light modulation device 4R, the light modulation device 4G, and the light modulation device 4B, there is used, for example, a transmissive liquid crystal panel. Further, in the incident side and the exit side of the liquid crystal panel, there are disposed polarization plates not shown, respectively.

At the incident side of the light modulation device 4R, there is disposed a field lens 10R. The field lens 10R collimates the red light LR entering the light modulation device 4R. At the incident side of the light modulation device 4G, there is disposed a field lens 10G. The field lens 10G collimates the green light LG entering the light modulation device 4G. At the incident side of the light modulation device 4B, there is disposed a field lens 10B. The field lens 10B collimates the blue light LB entering the light modulation device 4B.

The image light emitted from the light modulation device 4R, the image light emitted from the light modulation device 4G, and the image light emitted from the light modulation device 4B enter the combining optical system 5. The combining optical system 5 combines the image light corresponding to the red light LR, the image light corresponding to the green light LG, and the image light corresponding to the blue light LB with each other, and then emits the image light thus combined toward the projection optical device 6. As the combining optical system 5, there is used, for example, a cross dichroic prism.

The projection optical device 6 has a plurality of projection lenses. The projection optical device 6 projects the image light having been combined by the combining optical system 5 toward the screen SCR in an enlarged manner. Thus, the image thus enlarged is displayed on the screen SCR.

The configuration of the light source device 2 will hereinafter be described.

Figure 2:
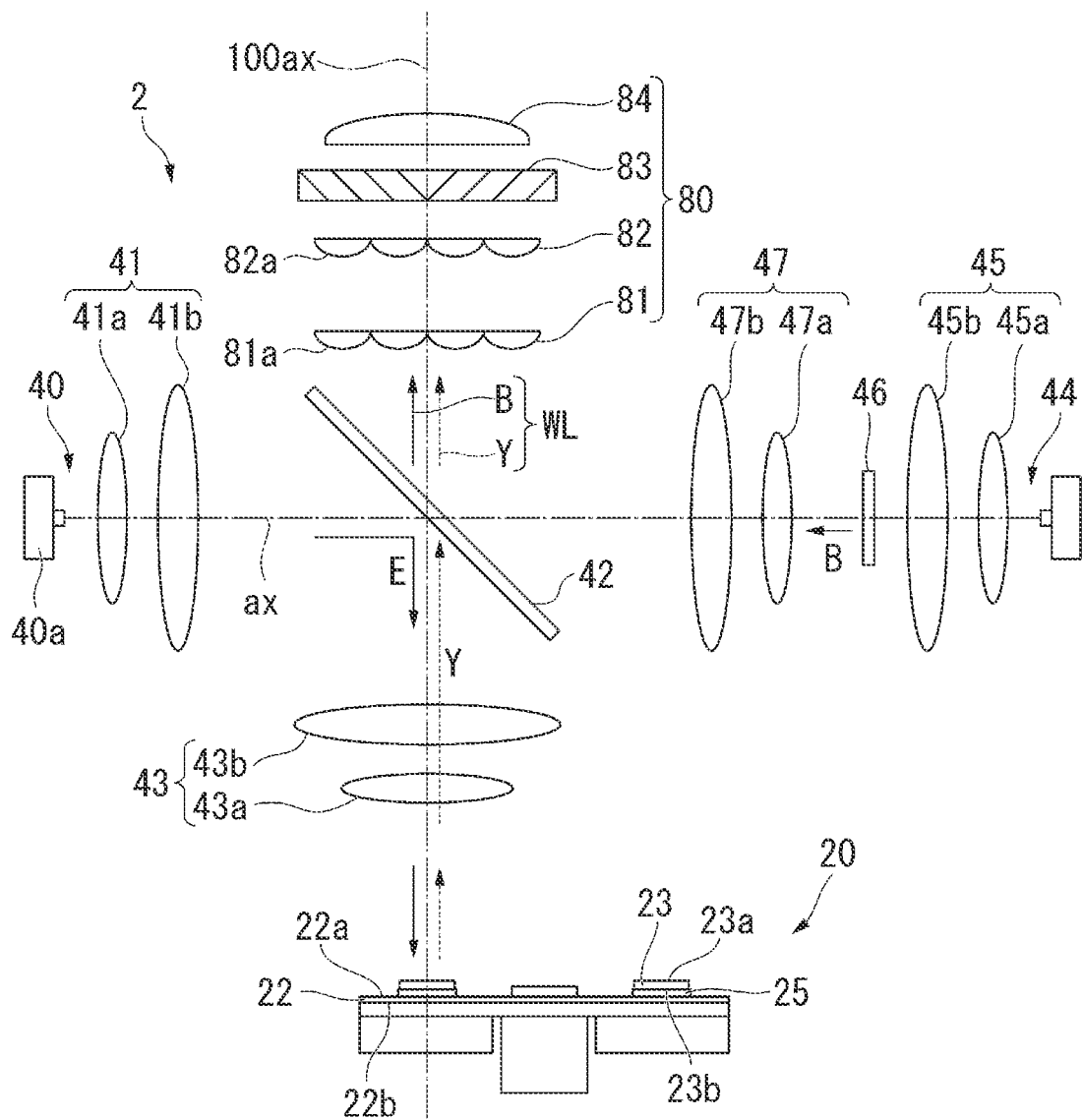
FIG. 2 is a schematic configuration diagram showing a light source device according to the embodiment.

FIG. 2 is a schematic configuration diagram showing the light source device 2 according to the present embodiment.

As shown in FIG. 2, the light source device 2 is provided with a first light source 40 as an excitation light source, a collimating optical system 41, a dichroic mirror 42, a collimating light collection optical system 43, a wavelength conversion device 20, a second light source 44, a light collection optical system 45, a diffuser plate 46, and a collimating optical system 47.

The first light source 40 is formed of a semiconductor laser 40a for emitting excitation light E having a blue color consisting of a laser beam. A peak in light emission intensity of the excitation light E is at, for example, 445 nm. It should be noted that it is also possible to use a semiconductor laser for emitting blue light having a wavelength other than 445 nm such as 455 nm or 460 nm as the semiconductor laser 40*a*. An optical axis ax of the first light source 40 is perpendicular to an illumination light axis 100*ax* of the light source device 2. It should be noted that the first light source 40 can be configured by arranging a plurality of semiconductor lasers 40*a* in an array in a single plane perpendicular to the optical axis ax of the first light source 40.

The collimating optical system 41 is provided with a first lens 41*a* and a second lens 41*b*. The collimating optical system 41 substantially collimates the light emitted from the first light source 40. The first lens 41*a* and the second lens 41*b* are each formed of a convex lens.

The dichroic mirror 42 is disposed in a light path from the collimating optical system 41 to the collimating light collection optical system 43 in a posture of crossing each of the optical axis ax of the first light source 40 and the illumination light axis 100*ax* at an angle of 45°. The dichroic mirror 42 reflects a blue light component, and transmits a red light component and a green light component. Therefore, the dichroic mirror 42 reflects the excitation light E and blue light B described later, and transmits fluorescence Y having a yellow color.

The collimating light collection optical system 43 makes the excitation light E having been transmitted through the dichroic mirror 42 converge to enter the wavelength conversion device 20, and at the same time, substantially collimates the fluorescence Y emitted from the wavelength conversion device 20. The collimating light collection optical system 43 is provided with a first lens 43*a* and a second lens 43*b*. The first lens 43*a* and the second lens 43*b* are each formed of a convex lens.

The second light source 44 is formed of a semiconductor laser having a wavelength band the same as the wavelength band of the first light source 40. It is possible for the second light source 44 to be formed of a single semiconductor laser, or to be formed of a plurality of semiconductor lasers. Further, it is also possible for the second light source 44 to be formed of a semiconductor laser different in wavelength band from the semiconductor laser of the first light source 40.

The light collection optical system 45 is provided with a first lens 45*a* and a second lens 45*b*. The blue light B emitted from the second light source 44 is converged by the light collection optical system 45 on a diffusion surface of the diffuser plate 46 or in the vicinity of the diffusion surface. The first lens 45*a* and the second lens 45*b* are each formed of a convex lens.

The diffuser plate 46 diffuses the blue light B emitted from the second light source 44 to thereby generate the blue light B having a light distribution similar to the light distribution of the fluorescence Y having been emitted from the wavelength conversion device 20. As the diffuser plate 46, there can be used, for example, obscured glass made of optical glass.

The collimating optical system 47 is provided with a first lens 47*a* and a second lens 47*b*. The collimating optical system 47 substantially collimates the light emitted from the diffuser plate 46. The first lens 47*a* and the second lens 47*b* are each formed of a convex lens.

The blue light B having been emitted from the second light source 44 is reflected by the dichroic mirror 42, and then combined with the fluorescence Y having been emitted from the wavelength conversion device 20 and then transmitted through the dichroic mirror 42 to thereby generate the illumination light WL having a white color. The illumination light WL enters a homogenous illumination optical system 80.

The homogenous illumination optical system 80 has a first lens array 81, a second lens array 82, a polarization conversion element 83, and a superimposing lens 84.

The first lens array 81 has a plurality of first lenses 81*a* for dividing the illumination light WL from the light source device 2 into a plurality of partial light beams. The plurality of first lenses 81*a* is arranged in a matrix in a plane perpendicular to the illumination light axis 100*ax*.

The second lens array 82 has a plurality of second lenses 82*a* corresponding respectively to the plurality of first lenses 81*a* of the first lens array 81. The plurality of second lenses 82*a* is arranged in a matrix in a plane perpendicular to the illumination light axis 100*ax*.

The second lens array 82 forms an image of each of the first lenses 81*a* of the first lens array 81 in the vicinity of each of the image forming areas of the light modulation device 4R, the light modulation device 4G, and the light modulation device 4B in cooperation with the superimposing lens 84.

The polarization conversion element 83 converts light emitted from the second lens array 82 into one linearly polarized light. The polarization conversion element 83 is provided with, for example, a polarization split film and a wave plate (not shown).

The partial light beams emitted from the polarization conversion element 83 are converged by the superimposing lens 84 and are superimposed on each other in the vicinity of each of the image forming areas of the light modulation device 4R, the light modulation device 4G, and the light modulation device 4B.

Then, the configuration of the wavelength conversion device 20 will be described.

Figure 3:
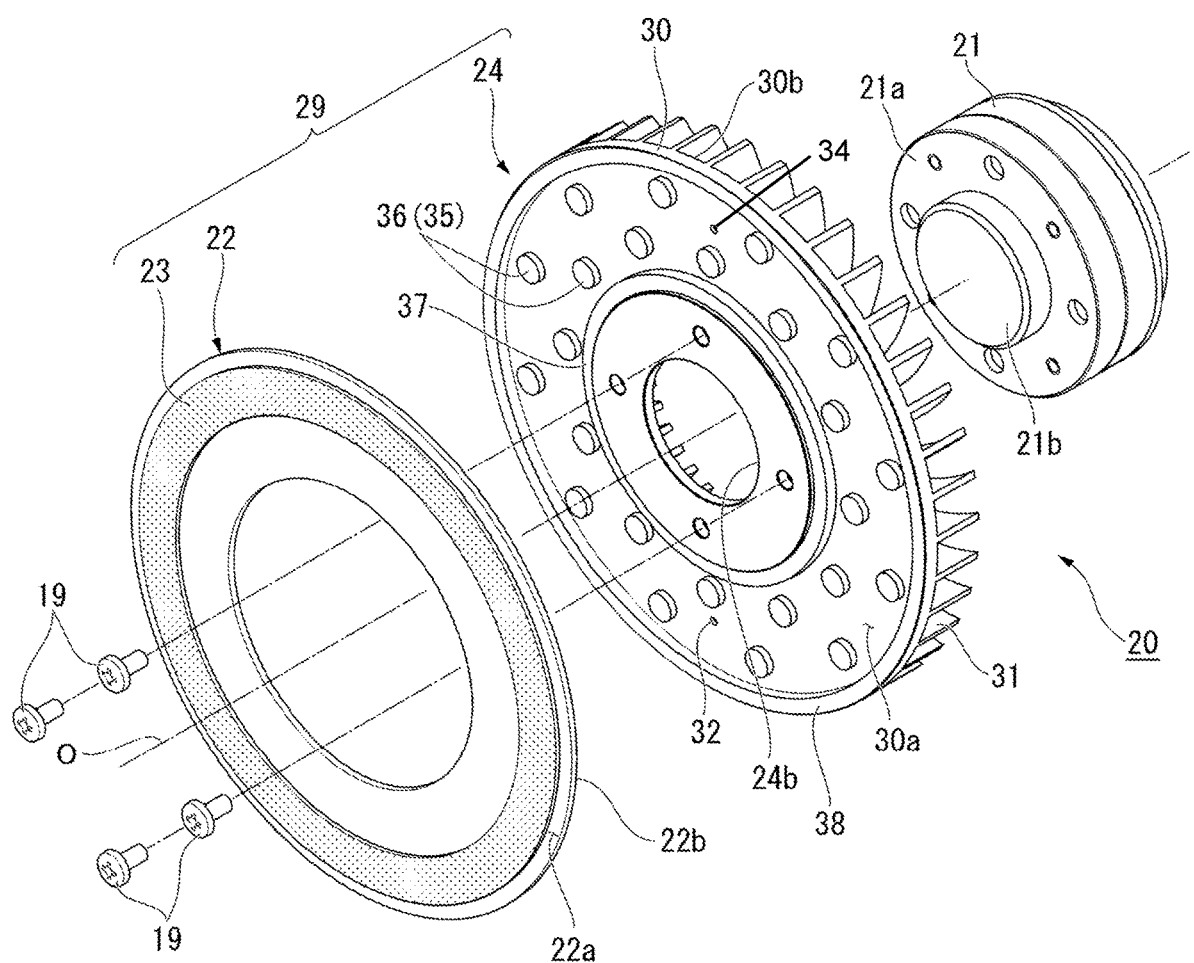
FIG. 3 is an exploded perspective view showing a schematic configuration of a wavelength conversion device.

FIG. 3 is an exploded perspective view showing a schematic configuration of the wavelength conversion device 20.

As shown in FIG. 3, the wavelength conversion device 20 according to the present embodiment is provided with a rotary drive section 21 and a rotating body 29. The rotating body 29 includes a wheel substrate 22, a phosphor layer 23, and a cooling fin unit 24.

The phosphor layer 23 generates heat when emitting the fluorescence Y. When the phosphor layer 23 becomes too high in temperature, the wavelength conversion efficiency of the fluorescence Y decreases, and there is a possibility that an amount of the fluorescence Y emitted decreases. In the wavelength conversion device 20 according to the present embodiment, as described later, it is arranged that a decrease in fluorescence conversion efficiency due to the rise in temperature of the phosphor layer 23 is suppressed by efficiently cooling the phosphor layer 23.

The rotary drive section 21 is formed of a motor device. The rotary drive section 21 has a rotary support part 21*a* which can rotate around a central axis O as a virtual axis line. The rotary support part 21*a* rotatably supports the cooling fin unit 24. The cooling fin unit 24 is provided with an opening part 24*b* for inserting a shaft part 21*b* of the rotary support part 21*a*.

The cooling fin unit 24 is supported by the rotary drive section 21 to thereby rotate around the central axis O. The cooling fin unit 24 is supported by the rotary support part 21*a* of the rotary drive section 21 via screw members 19.

In the following description, a radial direction with respect to the central axis O is simply referred to as a "radial direction." A direction of getting away from the central axis O in the radial direction is called an "outer side in the radial direction," and a direction of coming closer to the central axis O in the radial direction is called an "inner side in the radial direction." A circumferential direction centering on the central axis O is simply called a "circumferential direction."

The wheel substrate 22 has an obverse surface 22a as a first surface, and a reverse surface 22b which is a second surface, and is opposite to the obverse surface 22a. The reverse surface 22b of the wheel substrate 22 is coupled to the cooling fin unit 24. The wheel substrate 22 is formed of a metal plate having a ring-like shape made of a material excellent in radiation performance such as aluminum or copper. In other words, in the present embodiment, the wheel substrate 22 has thermal conductivity.

The phosphor layer 23 is formed on the obverse surface 22a of the wheel substrate 22 so as to have a ring-like shape around the central axis O. In other words, the phosphor layer 23 is disposed around the central axis O so as to have a ring-like shape. The phosphor layer 23 is disposed at an outer circumferential side on the obverse surface 22a of the wheel substrate 22.

Based on such a configuration, the rotating body 29 including the wheel substrate 22, the phosphor layer 23, and the cooling fin unit 24 is made capable of being rotated by the rotary drive section 21 centering on the central axis O.

As shown in FIG. 2, the phosphor layer 23 is excited by the excitation light E which enters the phosphor layer 23 from the upper surface 23a, and emits the fluorescence Y which has a yellow color and includes red light and green light from the upper surface 23a. As the phosphor layer 23, there is used, for example, YAG:Ce obtained by adding ceric ions (e.g., $Ce^{3+}$) to a garnet crystal (YAG) as $Y_3Al_5O_{12}$. It should be noted that the phosphor layer 23 can include appropriate scattering elements (not shown).

In the present embodiment, between the reverse surface 23b of the phosphor layer 23 and the obverse surface 22a of the wheel substrate 22, there is disposed a reflecting member 25. The light emitted from the reverse surface 23b of the phosphor layer 23 is reflected by the reflecting member 25 toward the upper surface 23a.

As shown in FIG. 3, the cooling fin unit 24 has a base part 30 and a plurality of radiator fins 31. The base part 30 is bonded to the wheel substrate 22. The base part 30 is formed of a circular disk plate made of metal excellent in radiation performance such as aluminum or copper. The base part 30 has substantially the same shape as that of the wheel substrate 22.

The base part 30 has an obverse surface 30a and a reverse surface 30b. The obverse surface 30a of the base part 30 is a surface opposed to the wheel substrate 22, namely a "surface at the wheel substrate 22 side." The reverse surface 30b of the base part 30 is a surface which faces oppositely to the obverse surface 30a, and which is attached to the rotary support part 21a of the rotary drive section 21.

Figure 4A:
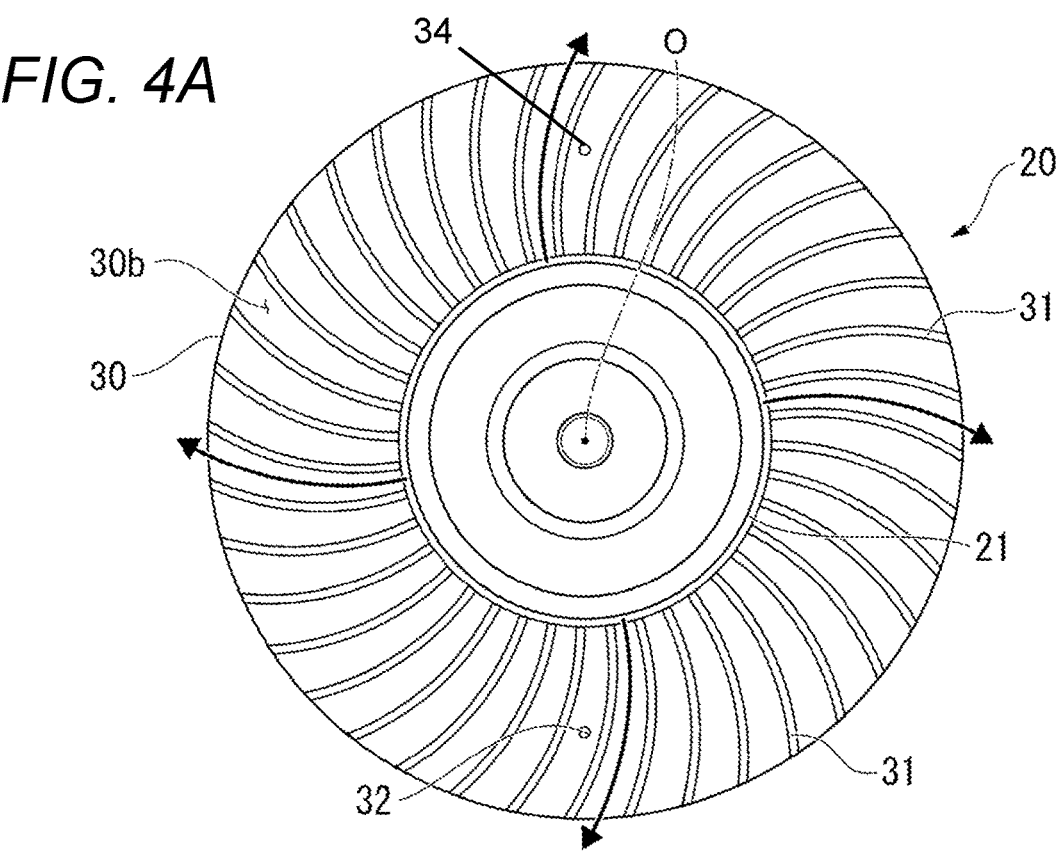
FIG. 4A is a diagram of the wavelength conversion device viewed from a reverse surface side of a base part.

FIG. 4A is a diagram of the wavelength conversion device 20 viewed from the reverse surface 30b side of the base part 30.

As shown in FIG. 4A, the plurality of radiator fins 31 is disposed on the reverse surface 30b of the base part 30. In other words, the plurality of radiator fins 31 is disposed at an opposite side to the wheel substrate 22 side of the base part 30. In the present embodiment, the plurality of radiator fins 31 is formed integrally with the base part 30. The plurality of radiator fins 31 is located at the outer side in the radial direction of the rotary drive section 21, and radially extends toward an outer edge of the base part 30. Each of the radiator fins 31 curves in an arching line, and is formed so as to extend in an oblique direction to a normal line of the outer edge of the base part 30.

Base on such a configuration, the cooling fin unit 24 rotates the plurality of radiator fins 31 together with the base part 30 centering on the central axis O to thereby cause an airflow of discharging air suctioned from the inner side in the radial direction (the central axis O side) toward the outer side in the radial direction using a centrifugal force along the radiator fins 31 at the reverse surface 30b side of the base part 30. In the case of the present embodiment, the airflow generated by the radiator fins 31 is also used to cool the rotary drive section 21 attached to a central portion of the base part 30.

It should be noted that the cooling fin unit 24 causes a flow of air from the inner side in the radial direction toward the outer side in the radial direction of the base part 30 irrespective of shapes of radiator fins 31 or a rotational direction of the base part 30.

Figure 4B:
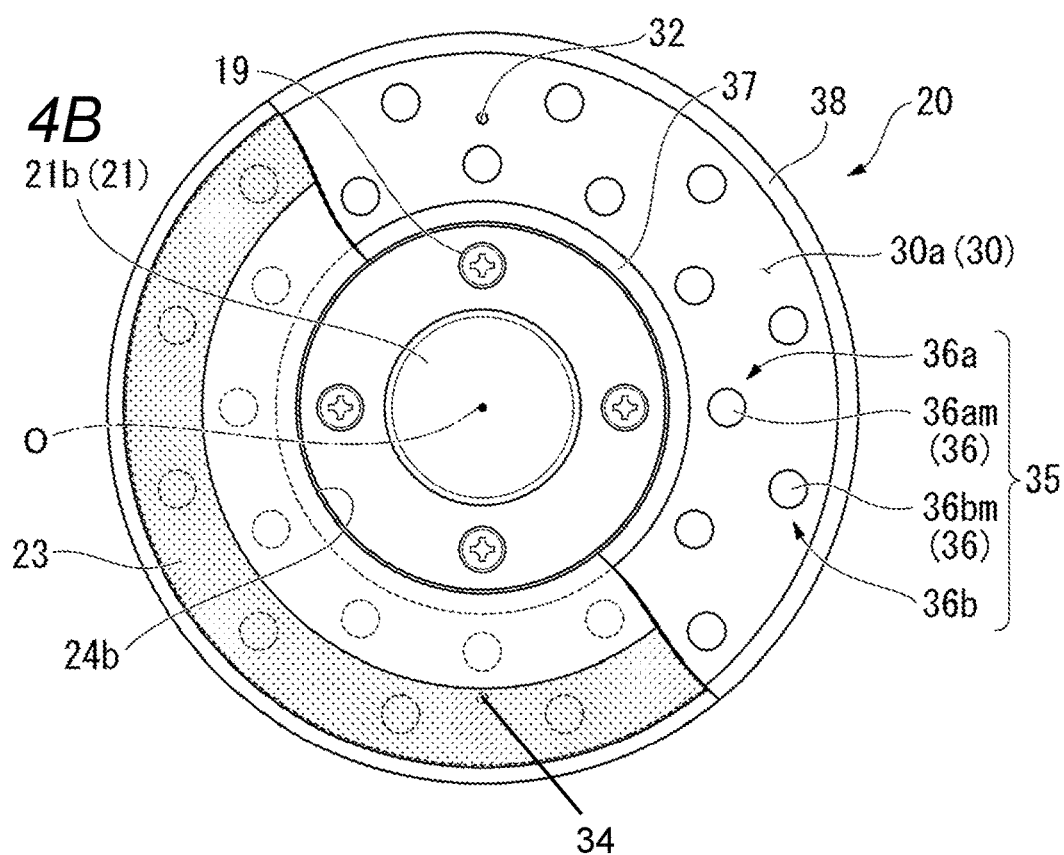
FIG. 4B is a plan view of the wavelength conversion device viewed from a wheel substrate side.

FIG. 4B is a plan view of the wavelength conversion device 20 viewed from the wheel substrate 22 side. It should be noted that in order to make the drawing eye-friendly, FIG. 4B illustrates the wavelength conversion device 20 in a state in which the wheel substrate 22 is partially cut out.

Figure 5:
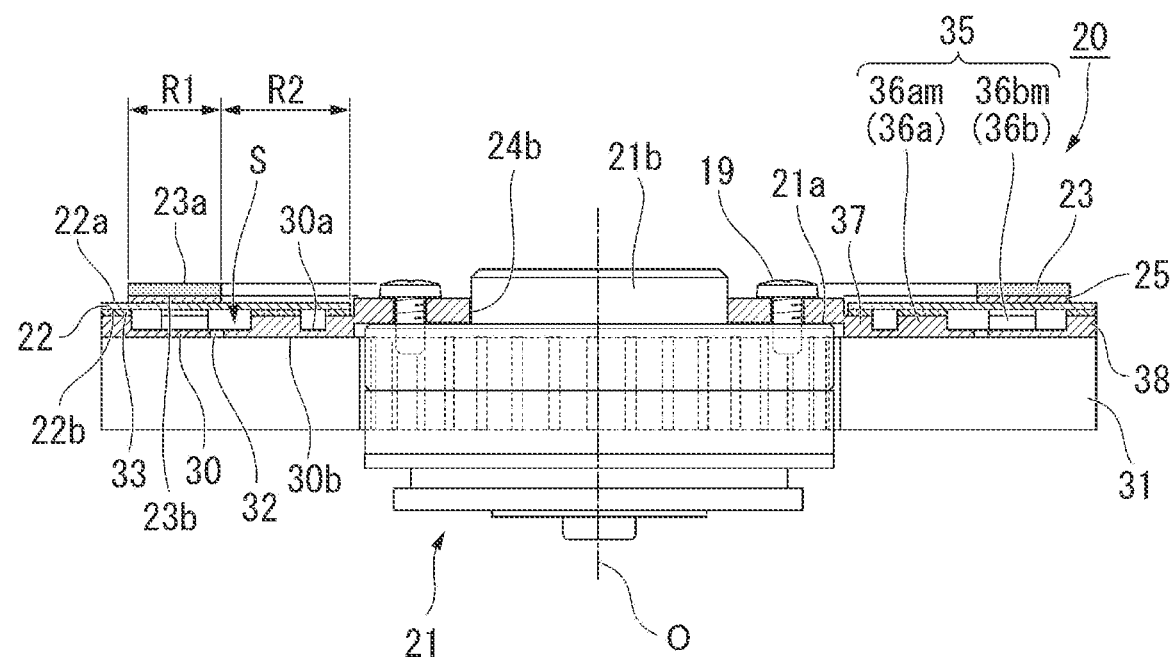
FIG. 5 is a cross-sectional view of the wavelength conversion device.

FIG. 5 is a cross-sectional view of the wavelength conversion device 20.

As shown in FIG. 5, the reverse surface 22b of the wheel substrate 22 includes an outer area R1 as a first area and an inner area R2 as a second area. In FIG. 5, in order to make the drawing eye-friendly, the reference symbols representing the outer area R1 and the inner area R2 are shown at an upper side of the wheel substrate 22.

The outer area R1 is an area corresponding to the phosphor layer 23. The inner area R2 is an area located at the central axis O side of the outer area R1.

In the present embodiment, the outer area R1 corresponds to an area overlapping an outline of the phosphor layer 23 formed on the obverse surface 22a of the wheel substrate 22 in a plan view. It should be noted that the outer area R1 is not required to completely coincide with the outline of the phosphor layer 23, and is only required to have substantially the same area as the outline of the phosphor layer 23.

The wavelength conversion device 20 according to the present embodiment is further provided with a coupling part 35 for thermally coupling the reverse surface 22b of the wheel substrate 22 and the obverse surface 30a of the base part 30 to each other. The coupling part 35 is disposed in at least the inner area R2 of the reverse surface 22b of the wheel substrate 22. In the case of the present embodiment, the coupling part 35 is arranged throughout the entire area of the reverse surface 22b including the inner area R2 and the outer area R1.

Here, the expression that the reverse surface 22b and the obverse surface 30a are thermally coupled to each other by the coupling part 35 means that the reverse surface 22b and the obverse surface 30a are directly or indirectly coupled to each other in a state in which the reverse surface 22b and the obverse surface 30a can transfer heat to each other via the coupling part 35. Specifically, the coupling part 35 and the reverse surface 22b or the obverse surface 30a can directly be coupled to each other without an intervention of another member, or another member such as an adhesive can intervene between the coupling part 35 and the reverse surface 22b or the obverse surface 30a.

In the wavelength conversion device 20 according to the present embodiment, by the wheel substrate 22 and the base part 30 being thermally coupled to each other with the coupling part 35, it is possible to efficiently transfer heat from the wheel substrate 22 to the base part 30 via the coupling part 35.

As shown in FIG. 5, in the case of the present embodiment, the coupling part 35 is formed integrally with the base part 30. In other words, the coupling part 35 is formed so as to protrude toward the wheel substrate 22 from the obverse surface 30a of the base part 30. In the present embodiment, the coupling part 35 is bonded to the reverse surface 22b of the wheel substrate 22 with solder 33. The solder 33 is excellent in thermal conductivity, and can therefore efficiently transfer heat from the wheel substrate 22 side to the base part 30 side.

It should be noted that a bonding material for bonding the coupling part 35 is not limited to the solder 33, and it is possible to use an adhesive excellent in thermal conductivity.

It should be noted that the coupling part 35 can be formed integrally with the reverse surface 22b of the wheel substrate 22. Alternatively, the coupling part 35 can be formed of a separate member from the wheel substrate 22 and the base part 30.

The coupling part 35 intervenes between the reverse surface 22b of the wheel substrate 22 and the obverse surface 30a of the base part 30 to thereby partially separate the reverse surface 22b of the wheel substrate 22 and the obverse surface 30a of the base part 30 from each other. In the wavelength conversion device 20 according to the present embodiment, since the reverse surface 22b of the wheel substrate 22 and the obverse surface 30a of the base part 30 are separated from each other, a space S is formed between the wheel substrate 22 and the base part 30. The space S is formed of an area where the coupling part 35 is not disposed.

In the present embodiment, the base part 30 is provided with through holes 32 and 34 penetrating between the obverse surface 20 a and the reverse surface 30 b. The through holes 32 and 34 communicate the space S formed between the wheel substrate 22 and the base part 30 with the outside. Specifically, in the present embodiment, the through holes 32 and 34 respectively function as an air inflow part for making air inflow into the space S, and an air outflow part for making air outflow from the space S.

As shown in FIG. 4B, the coupling part 35 includes a plurality of columnar bodies 36, and annular bodies 37, 38. The plurality of columnar bodies 36 includes a plurality of first columnar bodies 36am and a plurality of second columnar bodies 36bm.

The plurality of first columnar bodies 36am is arranged side by side at regular intervals in the circumferential direction around the central axis O. Each of the first columnar bodies 36am has a cylindrical shape. The coupling part 35 in the present embodiment includes a first columnar body group 36a constituted by the plurality of first columnar bodies 36am. The first columnar body group 36a is arranged in the inner area R2 in the reverse surface 22b of the wheel substrate 22.

The plurality of second columnar bodies 36bm is arranged at the outer side in the radial direction with respect to the first columnar body group 36a, and is arranged side by side at regular intervals in the circumferential direction around the central axis O. Each of the second columnar bodies 36bm has a cylindrical shape. The coupling part 35 in the present embodiment includes a second columnar body group 36b constituted by the plurality of second columnar bodies 36bm. The second columnar body group 36b is arranged in the outer area R1 in the reverse surface 22b of the wheel substrate 22.

The annular body 37 is formed to have a ring-like shape with respect to the central axis O. The annular body 37 is arranged in the inner area R2 in the reverse surface 22b of the wheel substrate 22. The annular body 37 is arranged at the inner side in the radial direction of the first columnar body group 36a. In the case of the present embodiment, the annular body 37 is arranged along an inner circumferential end of the reverse surface 22b of the wheel substrate 22.

The annular body 38 is formed to have a ring-like shape with respect to the central axis O. The annular body 38 is arranged at the outer side in the radial direction of the second columnar body group 36b. In the case of the present embodiment, the annular body 38 is arranged along an outer circumferential end of the reverse surface 22b of the wheel substrate 22. In the present embodiment, a part of the annular body 38 is arranged so as to overlap the outer area R1 in the reverse surface 22b of the wheel substrate 22. It should be noted that the annular body 38 can be disposed in the further outer side area than the outer area R1.

As shown in FIG. 4B, the first columnar bodies 36am constituting the first columnar body group 36a and the second columnar bodies 36bm constituting the second columnar body group 36b are different in position in the radial direction from each other. In other words, the first columnar bodies 36am and the second columnar bodies 36bm are arranged so as not to linearly be arranged side by side in the radial direction.

As shown in FIG. 2, the wavelength conversion device 20 according to the present embodiment emits the fluorescence Y by making the excitation light E from the first light source 40 enter the upper surface 23a of the phosphor layer 23 rotated by the rotary drive section 21. The phosphor layer 23 generates heat when emitting the fluorescence Y. The heat of the phosphor layer 23 is transferred to the wheel substrate 22.

The heat of the wheel substrate 22 is transferred from the reverse surface 22b of the wheel substrate 22 to the base part 30 via the coupling part 35. The heat of the base part 30 is released via the radiator fins 31 disposed on the reverse surface 30b of the base part 30.

Here, in general, the farther it gets from a heat source, the more difficult it becomes to transfer heat. Therefore, the heat is not transferred well to a region distant from the heat source out of the radiator fins, and it is difficult to make the whole of the radiator fins function effectively.

In the case of the present embodiment, since the phosphor layer 23 is disposed at the outer side in the radial direction of the wheel substrate 22, by transferring the heat well to the inner side in the radial direction of the radiator fins 31, it becomes possible to enhance the cooling performance by the radiator fins 31.

In the case of the present embodiment, the heat of the phosphor layer 23 is transferred to the inner side in the radial direction distant from the phosphor layer 23 as a heat source due to the wheel substrate 22. The heat transferred to the wheel substrate 22 is efficiently transferred to the inner side (the central axis O side) of the base part 30 via the coupling part 35 arranged in the inner area R2 located closer in the inner side in the radial direction than the phosphor layer 23, namely the first columnar body group 36a and the annular body 37. The heat having been transferred to the inner side in the radial direction (the central axis O side) of the base part 30 is efficiently transferred to the inner side in the radial direction (the central axis O side) of the radiator fins 31 disposed on the reverse surface 30b of the base part 30.

As described above, according to the wavelength conversion device 20 related to the present embodiment, it is possible to transfer the heat of the phosphor layer 23 to the inner side in the radial direction of the radiator fins 31 distant from the phosphor layer 23 as the heat source.

In the wavelength conversion device 20 according to the present embodiment, the heat of the wheel substrate 22 propagates to the base part 30 via the space S formed between the wheel substrate 22 and the base part 30. Specifically, it is possible for the heat of the phosphor layer 23 to be transferred to the base part 30 via the space S formed between the wheel substrate 22 and the base part 30, and then transferred from the base part 30 to the whole of the radiator fins 31. The heat having been transferred to the base part 30 is released via the radiator fins 31.

Incidentally, due to the heat of the wheel substrate 22, the air in the space S between the wheel substrate 22 and the base part 30 is warmed. In the case of the present embodiment, since the space S and the outside are communicated with each other by the through holes 32 provided to the base part 30, the air which is warmed in the space S to thereby be thermally expanded is arranged to be discharged to the outside via the through holes 32. Therefore, it is possible to prevent the occurrence of failures such as deformations or separations of the wheel substrate 22 and the base part 30 due to an increase in the inner pressure of the space S caused by the air thus thermally expanded.

Further, in the wavelength conversion device 20 according to the present embodiment, the heat of the wheel substrate 22 is also transferred efficiently to the outer side in the radial direction of the base part 30 via the coupling part 35 disposed in the outer area R1, namely the second columnar body group 36b and the annular body 38. In other words, in the case of the present embodiment, the heat of the wheel substrate 22 is efficiently transferred to the whole in the radial direction of the base part 30. Therefore, it is possible to efficiently transfer the heat from the base part 30 to the whole in the radial direction of the radiator fins 31. By transferring the heat of the base part 30 to the whole in the radial direction of the radiator fins 31 in such a manner, it is possible to efficiently release the heat from the whole of the radiator fins 31.

In the case of the present embodiment, by the plurality of fins 31 rotating in accordance with the rotation of the rotating body 29, there occurs the airflow from the inner side in the radial direction (the central axis O side) toward the outer side in the radial direction of the base part 30. Therefore, it results in that the cool air which has not absorbed the heat is supplied to the inner side in the radial direction (the central axis O side) of the radiator fins 31.

Therefore, according to the wavelength conversion device 20 related to the present embodiment, by supplying the cool air from the inner side in the radial direction (the central axis O side) toward the outer side in the radial direction of the radiator fins 31 to which the heat is transferred from the wheel substrate 22, it is possible to efficiently cool the whole of the radiator fins 31. Therefore, it is possible for the wavelength conversion device 20 according to the present embodiment to generate the fluorescence Y high in luminance by efficiently cooling the phosphor layer 23 to thereby increase the wavelength conversion efficiency of the phosphor layer 23.

As described hereinabove, according to the wavelength conversion device 20 related to the present embodiment, it is possible to efficiently transfer the heat to the inner side in the radial direction (the central axis O side) of the radiator fins 31 distant from the phosphor layer 23 as the heat source. Further, by feeding the cool air from the inner side in the radial direction (the central axis O side) of the radiator fins 31, it is possible to enhance the cooling performance of the radiator fins 31. Therefore, it is possible to enhance the cooling performance of the radiator fins 31 without growing the radiator fins 31 in size.

It should be noted that since when the radiator fins grow in size, the weight of the cooling fin unit increases, it becomes necessary to adopt a large-sized motor high in drive power as the rotary drive section for rotating the cooling fin unit, and there arises a problem of the growth in size of the wavelength conversion device.

In contrast, in the wavelength conversion device 20 according to the present embodiment, since it is possible to prevent the growth in size of the radiator fins 31 as described above, it is possible to prevent the problem described above from occurring. As described above, according to the present embodiment, it is possible to provide the wavelength conversion device 20 which prevents the growth in size of the device configuration, and at the same time, efficiently cools the phosphor layer 23 to thereby increase the wavelength conversion efficiency of the phosphor layer 23, and thus, generates the fluorescence Y high in luminance.

Further, in the wavelength conversion device 20 according to the present embodiment, the coupling part 35 includes the plurality of columnar bodies 36.

According to this configuration, since there is achieved the configuration in which the wheel substrate 22 and the base part 30 are partially coupled to each other, it is possible to suppress an increase in weight of the wavelength conversion device 20 compared to when disposing the coupling part 35 on the whole of the reverse surface 22b of the wheel substrate 22. Further, since it is possible to reduce a load on the power of the rotary drive section 21, small-sized one can be adopted as the rotary drive section 21.

Further, in the wavelength conversion device 20 according to the present embodiment, the coupling part 35 includes the first columnar body group 36a constituted by the plurality of first columnar bodies 36am arranged side by side in the circumferential direction around the central axis O.

According to this configuration, there is achieved the configuration in which the wheel substrate 22 and the base part 30 are partially coupled to each other in the circumferential direction around the central axis O. Thus, it is possible for the rotating body of the wheel substrate 22 and the cooling fin unit 24 to rotate while keeping the balance with respect to the central axis O. Therefore, the load on the power of the rotary drive section 21 can be reduced. Further, since it is possible to propagate the heat from the wheel substrate 22 to the base part 30 in the circumferential direction around the central axis O, it is possible to homogenously cool the phosphor layer 23 having the ring-like shape. Therefore, the cooling efficiency of the phosphor layer 23 can be improved.

Further, in the wavelength conversion device 20 according to the present embodiment, the coupling part 35 includes the second columnar body group 36b constituted by the plurality of second columnar bodies 36bm which is arranged in the outer side area in the radial direction with respect to the first columnar body group 36a, and is arranged side by side in the circumferential direction around the central axis O.

According to this configuration, by providing the second columnar body group 36b at the outer side in the radial direction of the first columnar body group 36a, it is possible to further enhance the thermal conductivity from the wheel substrate 22 to the base part 30 side in the radial direction. Therefore, it is possible to more efficiently cool the phosphor layer 23.

Further, in the wavelength conversion device 20 according to the present embodiment, the first columnar bodies 36am constituting the first columnar body group 36a and the second columnar bodies 36bm constituting the second columnar body group 36b are different in position in the radial direction with respect to the central axis O from each other.

According to this configuration, it is possible to sufficiently keep a gap between the first columnar bodies 36am and the second columnar bodies 36bm compared to when the first columnar bodies 36am and the second columnar bodies 36bm are the same in position in the radial direction as each other. Thus, since it is possible to homogenously transfer the heat from the entire surface of the wheel substrate 22 toward the base part 30, the cooling performance of the phosphor layer 23 can further be enhanced.

Further, in the wavelength conversion device 20 according to the present embodiment, the second columnar body group 36b is disposed in the outer area R1 corresponding to the phosphor layer 23.

According to this configuration, it is possible to transfer the heat of the phosphor layer 23 to the outer side in the radial direction of the radiator fins 31 with the second columnar body group 36b. Therefore, by transferring the heat from the wheel substrate 22 side to the whole in the radial direction of the radiator fins 31, the cooling performance of the phosphor layer 23 can further be enhanced.

Further, in the wavelength conversion device 20 according to the present embodiment, the coupling part 35 includes the annular bodies 37, 38 each formed to have an annular shape with respect to the central axis O.

According to this configuration, since there is achieved the configuration in which the wheel substrate 22 and the base part 30 are partially coupled to each other with the annular bodies 37, 38, it is possible to suppress an increase in weight of the wavelength conversion device 20 compared to when disposing the coupling part 35 on the whole of the reverse surface 22b of the wheel substrate 22. Further, since it is possible to reduce a load on the power of the rotary drive section 21, small-sized one can be adopted as the rotary drive section 21.

Further, since the wheel substrate 22 and the base part 30 are thermally coupled to each other throughout the circumferential direction, the phosphor layer 23 having the ring-like shape can homogenously be cooled. Therefore, the cooling efficiency of the phosphor layer 23 can be improved.

Further, in the wavelength conversion device 20 according to the present embodiment, the wheel substrate 22 and the coupling part 35 are bonded to each other with solder.

According to this configuration, it is possible to efficiently transfer heat from the wheel substrate 22 side to the base part 30 side via the solder excellent in thermal conductivity. It should be noted that although the solder is heavy in weight, it is possible to suppress the weight of the wavelength conversion device 20 in the present embodiment by adopting the columnar bodies and the annular bodies described above as the coupling part 35.

The light source device 2 in the present embodiment is provided with the wavelength conversion device 20 and the first light source 40 for emitting the excitation light E toward the wavelength conversion device 20.

According to the light source device 2 in the present embodiment, since there is provided the wavelength conversion device 20 which prevents the growth in size of the device configuration, and generates the fluorescence Y high in luminance, it is possible to emit the illumination light WL high in luminance while keeping the size small.

The projector 1 according to the present embodiment is provided with the light source device 2, the light modulation devices 4B, 4G, and 4R for modulating the light emitted from the light source device 2 in accordance with the image signal, and the projection optical device 6 for projecting the light modulated by the light modulation devices 4B, 4G, and 4R.

According to the projector 1 related to the present embodiment, it is possible to realize the projector which is excellent in display quality and is high in efficiency while keeping the size small.

Second Embodiment

A second embodiment of the present disclosure will hereinafter be described.

A wavelength conversion device according to the second embodiment is substantially the same in basic configuration as that of the first embodiment, but is different in configuration of the wheel substrate and the coupling part from that of the first embodiment. Therefore, the basic configuration common to the first embodiment will be denoted by the same reference symbols, and the detailed description thereof will be omitted.

Figure 6:
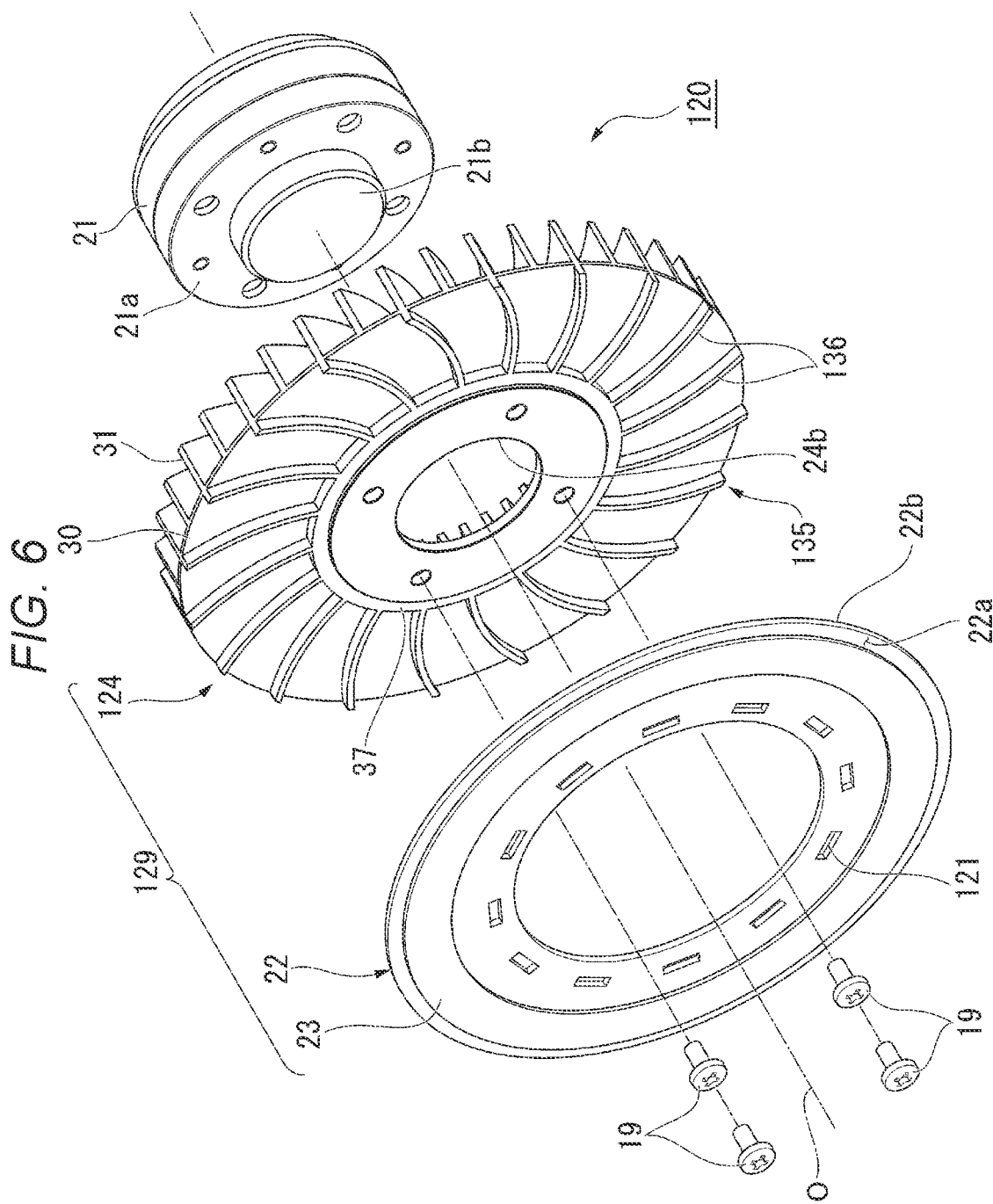
FIG. 6 is an exploded perspective view of a wavelength conversion device according to a second embodiment.
Figure 7:
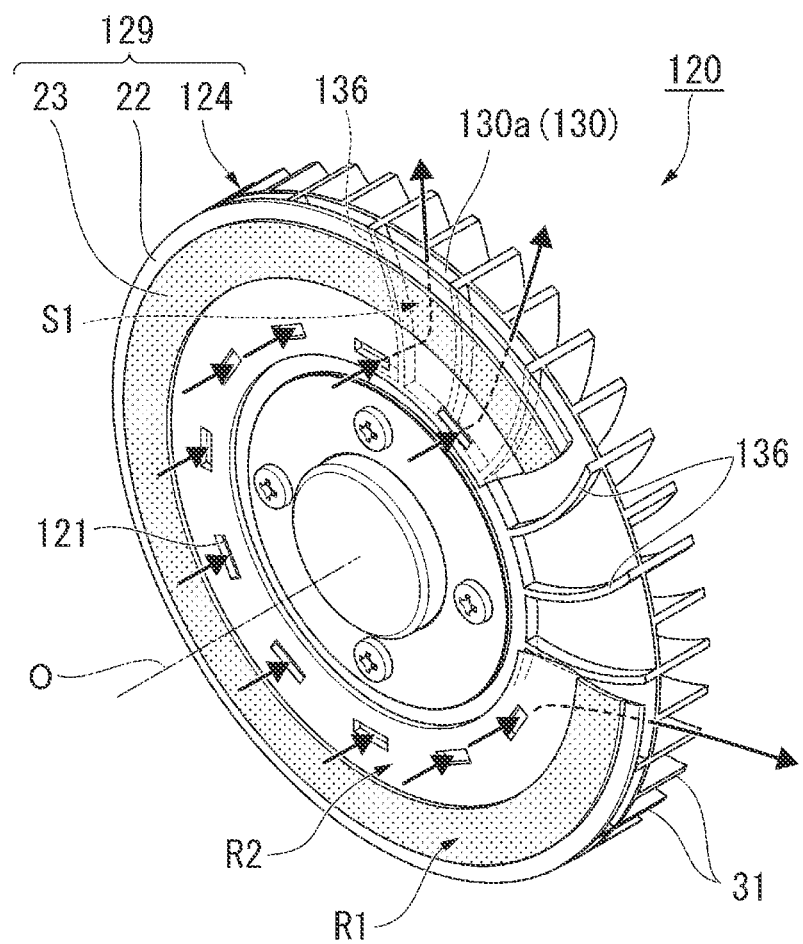
FIG. 7 is a diagram showing a function of the wavelength conversion device.

FIG. 6 is an exploded perspective view of the wavelength conversion device 120 according to the second embodiment. FIG. 7 is a perspective view showing a function of the wavelength conversion element 120. It should be noted that in order to make the drawing eye-friendly, FIG. 7 illustrates the wavelength conversion device 120 in a state in which the wheel substrate 22 is partially cut out.

As shown in FIG. 6, the wavelength conversion device 120 according to the present embodiment is provided with a rotary drive section 21 and a rotating body 129. The rotating body 129 includes the wheel substrate 22, the phosphor layer 23, and a cooling fin unit 124.

A coupling part 135 in the present embodiment includes a plurality of strip bodies 136 and the annular body 37. The plurality of strip bodies 136 radially extends from the inner area R2 toward the outer area R1. The plurality of strip bodies 136 is coupled to the annular body 37 at the inner side in the radial direction. The height of the strip bodies 136 is equal to the height of the annular body 37.

As shown in FIG. 7, the strip bodies 136 have shapes corresponding respectively to the radiator fins 31 formed on the reverse surface 30b of the base part 30. The strip bodies 136 each have the same profile as that of the radiator fin 31 when viewed in a direction along the central axis O. Each of the strip bodies 136 curves in an arching line, and is formed in a spirally radial fashion so as to extend in an oblique direction to a normal line of the outer edge of the base part 30.

The strip bodies 136 are respectively arranged at positions corresponding alternately to the radiator fins 31 arranged side by side in the circumferential direction. In other words, the number of the strip bodies 136 is half as many as the number of the radiator fins 31.

In the present embodiment, as the coupling part 135, there is adopted a configuration in which the strip bodies 136 are coupled to each other with the annular body 37 only at the inner side in the radial direction.

On an outer circumferential surface 130 in the rotating body 129 in the present embodiment, there is formed a plurality of outer circumferential opening parts 130a as air outflow parts communicated with a space S1 formed between the wheel substrate 22 and the base part 30. In other words, the outer circumferential opening parts 130a are disposed on the outer circumferential surface 130 as an outer circumference of the space S1.

The space S1 formed between the wheel substrate 22 and the base part 30 is communicated with the outside via the outer circumferential opening parts 130a. It should be noted that in the present embodiment, the through holes 32 (see FIG. 3) can be provided to the base part 30, but can be omitted as needed since the space S1 is communicated with the outside by the outer circumferential opening parts 130a.

In the wavelength conversion device 120 according to the present embodiment, at an inner circumferential side of the wheel substrate 22 having the annular shape, there is formed a plurality of opening parts 121 as air inflow parts along the circumferential direction. The plurality of opening parts 121 is formed in the inner area R2 constituting the space S1. Each of the opening parts 121 is disposed so as not to overlap the coupling part 135 in an axial direction along the central axis O. In other words, the space S1 is communicated with the outside via each of the opening parts 121.

According to the wavelength conversion device 120 related to the present embodiment, substantially the same advantages as those of the embodiment described above can be exerted. In other words, in the present embodiment, the heat of the wheel substrate 22 is efficiently transferred to the inner side in the radial direction (the central axis O side) of the base part 30 via the coupling part 135 constituted by the strip bodies 136 disposed in the inner area R2 located in the inner side in the radial direction than the phosphor layer 23. The heat having been transferred to the inner side in the radial direction (the central axis O side) of the base part 30 is efficiently transferred to the inner side in the radial direction (the central axis O side) of the radiator fins 31 disposed on the reverse surface 30b of the base part 30.

As described above, according to the wavelength conversion device 120 related to the present embodiment, it is possible to efficiently transfer the heat to the inner side in the radial direction (the central axis O side) of the radiator fins 31 distant from the phosphor layer 23 as the heat source. Further, by feeding the cool air from the inner side in the radial direction (the central axis O side) of the radiator fins 31, it is possible to enhance the cooling performance of the radiator fins 31 to thereby efficiently cool the phosphor layer 23.

Further, in the wavelength conversion device 120 according to the present embodiment, when the rotating body 129 rotates around the central axis O, the air is taken in the space S1 via the plurality of opening parts 121 provided to the wheel substrate 22. The air taken in the space S1 flows toward the outer side in the radial direction along the strip bodies 136, and is then discharged to the outside from the outer circumferential opening parts 130a formed on the outer circumferential surface 130 of the rotating body 129.

Here, when generating the fluorescence Y, due to the heat of the wheel substrate 22, the air in the space S1 between the wheel substrate 22 and the base part 30 is warmed. In the case of the present embodiment, the air which is warmed in the space S1 to thereby be thermally expanded is efficiently discharged to the outside together with the air flowing from the opening parts 121 toward the outer circumferential opening parts 130a. Thus, it is possible to prevent the occurrence of failures such as deformations or separations of the wheel substrate 22 and the base part 30 due to an increase in the inner pressure of the space S1 caused by the air thus thermally expanded.

Further, the air flowing from the opening parts 121 toward the outer circumferential opening parts 130a is also used to cool the base part 30 and the wheel substrate 22. Therefore, according to the present embodiment, the cooling performance of the phosphor layer 23 can further be enhanced.

Third Embodiment

A third embodiment of the present disclosure will hereinafter be described.

A wavelength conversion device according to the third embodiment is substantially the same in basic configuration as that of the first embodiment, but is different in configuration of providing a thermodiffusion aiding member from that of the first embodiment. Therefore, the basic configuration common to the first embodiment will be denoted by the same reference symbols, and the detailed description thereof will be omitted.

Figure 8:
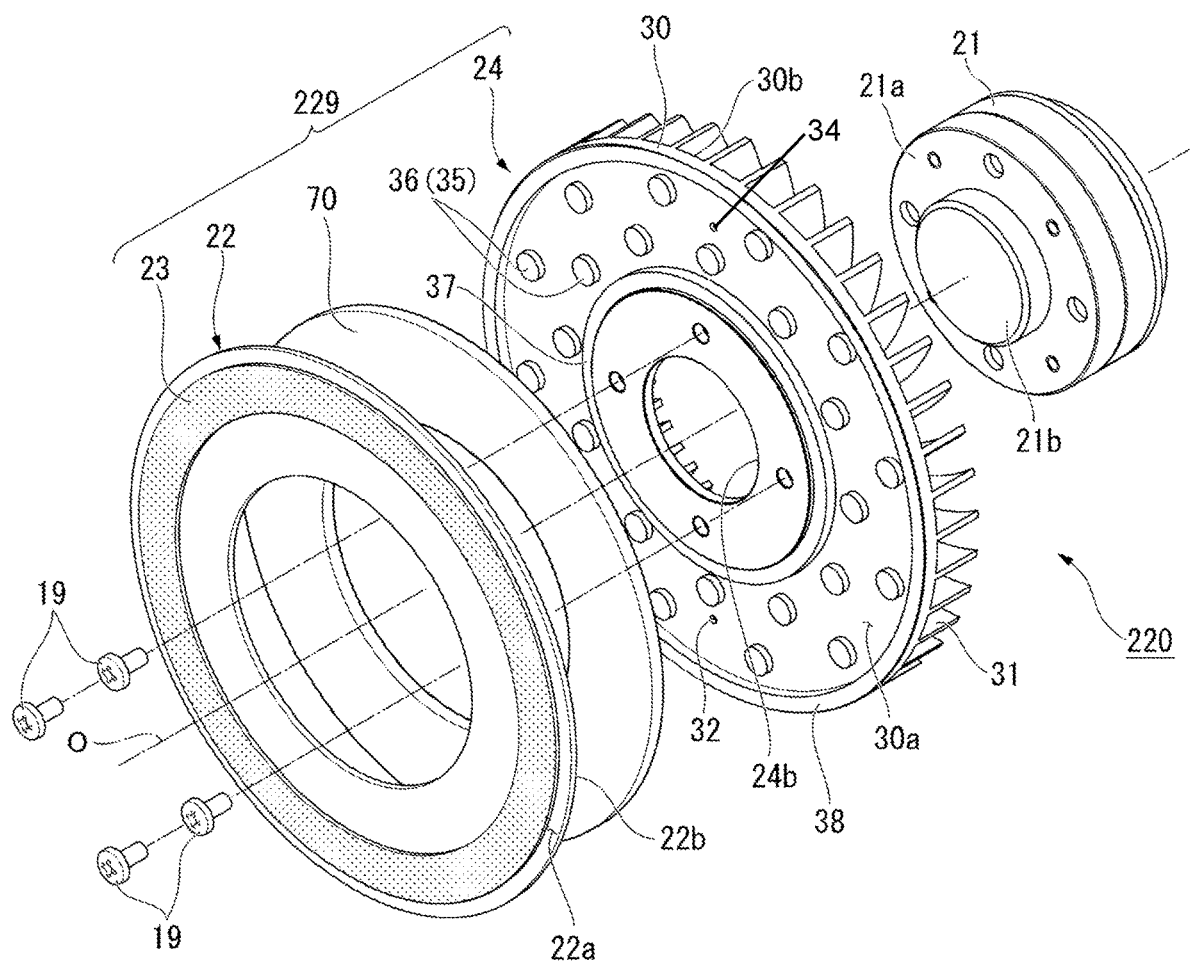
FIG. 8 is an exploded perspective view of a wavelength conversion device according to a third embodiment.
Figure 9:
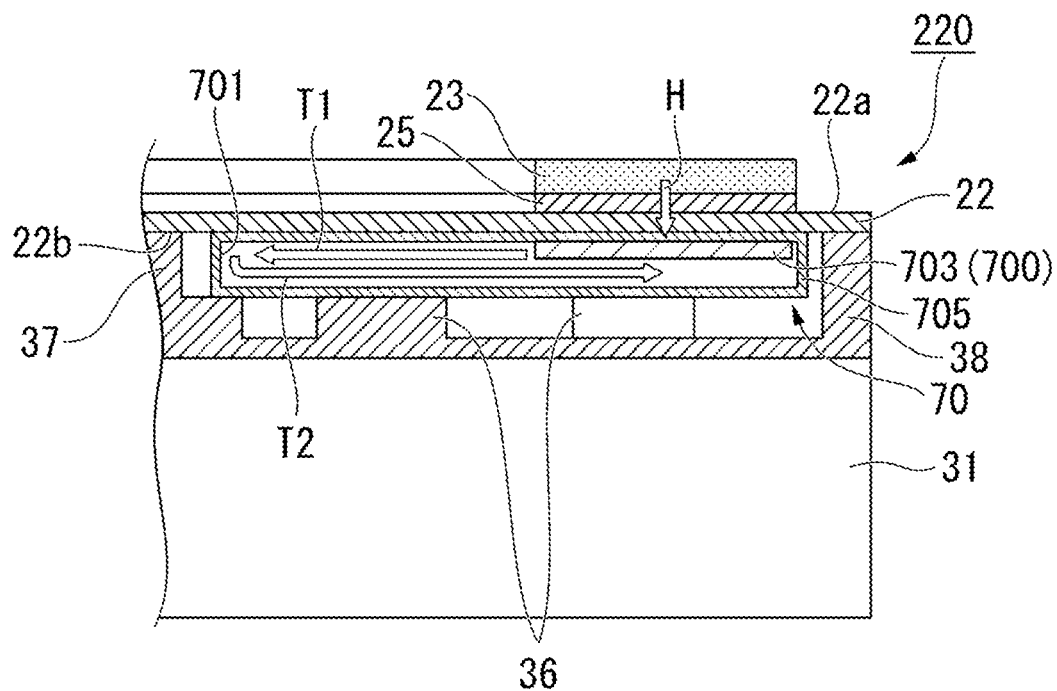
FIG. 9 is a cross-sectional view of the wavelength conversion device.

FIG. 8 is an exploded perspective view of the wavelength conversion device 220 according to the third embodiment. FIG. 9 is a cross-sectional view showing a configuration of an essential part of the wavelength conversion device 220.

As shown in FIG. 8, the wavelength conversion device 220 according to the present embodiment is provided with a rotary drive section 21 and a rotating body 229. The rotating body 229 includes the wheel substrate 22, the phosphor layer 23, the cooling fin unit 24, and a thermodiffusion aiding member 70 intervening between the wheel substrate 22 and the base part 30.

In the present embodiment, the thermodiffusion aiding member 70 is located between the reverse surface 22b of the wheel substrate 22 and the coupling part 35. The coupling part 35 thermally couples the reverse surface 22b of the wheel substrate 22 and the obverse surface 30a of the base part 30 to each other via the thermodiffusion aiding member 70.

The thermodiffusion aiding member 70 is disposed around the central axis O so as to have a ring-like shape. The thermodiffusion aiding member 70 is disposed between the annular bodies 37, 38 in the radial direction. The thermodiffusion aiding member 70 is disposed so as to overlap the plurality of columnar bodies 36.

In other words, the thermodiffusion aiding member 70 is disposed so as not to overlap the annular bodies 37, 38 in the axial direction. In the present embodiment, the wheel substrate 22 and the base part 30 are bonded to each other via the annular bodies 37, 38. It should be noted that in the case of the present embodiment, the height of the annular bodies 37, 38 is set to a height obtained by adding the height of the columnar body 36 and the height of the thermodiffusion aiding member 70 to each other.

Then, a configuration of the thermodiffusion aiding member 70 will be described.

As shown in FIG. 9, the thermodiffusion aiding member 70 in the present embodiment includes a case 705 having thermal conductivity and encapsulating a working fluid which changes between a liquid phase and a gas phase due to an evaporation section 700 and a condensation section 701. It should be noted that as a formation material of the case 705, there is adopted metal such as copper having thermal conductivity.

In the case 705, there is encapsulated the working fluid in a reduced pressure state. Therefore, the working fluid evaporates at a lower boiling point in the space in the case 705 compared to the boiling temperature under the atmospheric pressure. It should be noted that water can be adopted as the working fluid.

The evaporation section 700 evaporates the working fluid in the liquid phase with the heat transferred from the phosphor layer 23 to change the working fluid in the liquid phase to the working fluid in the gas phase. The evaporation section 700 has a liquid retaining section 703 for retaining the working fluid in the liquid phase, and is a region including an area where the liquid retaining section 703 is disposed.

The condensation section 701 condenses the working fluid in the gas phase to change the working fluid in the gas phase to the working fluid in the liquid phase. The condensation section 701 is a region including an area at the inner side in the radial direction in the case 705.

The liquid retaining section 703 is disposed at a position corresponding to the phosphor layer 23. In other words, the liquid retaining section 703 is disposed so as to be opposed to the phosphor layer 23 in the axial direction. The liquid retaining section 703 has a ring-like outer shape in a plan view viewed from the axial direction.

The working fluid in the liquid phase permeates and is retained by the liquid retaining section 703. Therefore, as the liquid retaining section 703, there is adopted a porous body having a plurality of holes or a molded body of fibers so that the working fluid in the liquid phase permeates the liquid retaining section 703. As the constituent material of the porous body, it is possible to adopt metal such as stainless steel or copper, or an inorganic material such as glass or ceramics. As the constituent material of the fiber, it is possible to adopt metal such as stainless steel or copper, or an inorganic material such as glass. As the molded body, there can be cited unwoven cloth formed by performing compression molding on the fibers, and what is obtained by interweaving the fibers to have a mesh-like shape.

It should be noted that in the present embodiment, except the liquid retaining section 703, the evaporation section 700 and the condensation section 701 vary in positions in accordance with the operating condition of the thermodiffusion aiding member 70.

Based on such a configuration, the heat H having been transferred to the thermodiffusion aiding member 70 is transferred to the inside of the case 705 via the wheel substrate 22. The evaporation section 700 evaporates the working fluid in the liquid phase retained in the liquid retaining section 703 with the heat H to change the working fluid in the liquid phase to the working fluid in the gas phase. On this occasion, due to the evaporation heat of the working fluid in the liquid phase, the heat of the phosphor layer 23 is absorbed via the wheel substrate 22, and thus, the phosphor layer 23 is cooled.

The working fluid having changed from the liquid phase to the gas phase migrates toward the central axis O side (the inner side in the radial direction) mainly as a flow T1 and then reaches the condensation section 701 while keeping the heat from the phosphor layer 23. The condensation section 701 condenses the working fluid in the gas phase to change the working fluid in the gas phase to the working fluid in the liquid phase. On this occasion, the working fluid in the gas phase releases the heat to be condensed. The heat having been released from the working fluid in the gas phase is released to the outside of the thermodiffusion aiding member 70 from the condensation section 701.

Meanwhile, the working fluid having changed from the gas phase to the liquid phase migrates to the evaporation section 700 at the outer side in the radial direction mainly as a flow T2.

It should be noted that the flows T1, T2 of the working fluid show principal flow lines of the working fluid, and the flow of the working fluid is not limited to the flows T1, T2.

Here, in the case of the present embodiment, when the thermodiffusion aiding member 70 is in operation, the wheel substrate 22 is rotating, and therefore, a centrifugal force toward the outer side in the radial direction of the wheel substrate 22 occurs. Thus, the centrifugal force acts on the working fluid having changed from the gas phase to the liquid phase, and thus, the migration toward the outer side in the radial direction is promoted. The working fluid in the liquid phase having migrated to the evaporation section 700 is retained by the liquid retaining section 703.

As described above, the thermodiffusion aiding member 70 in the present embodiment is a so-called vapor chamber, and continuously and repeatedly develops the evaporation and the condensation of the working fluid to thereby diffuse the heat in the plane, and thus, make it possible to cool the phosphor layer 23.

In the wavelength conversion device 220 according to the present embodiment, the heat of the phosphor layer 23 is transferred to the thermodiffusion aiding member 70 via the wheel substrate 22. The thermodiffusion aiding member 70 diffuses the heat received from the wheel substrate 22 in a plane. Therefore, it is possible for the coupling part 35 constituted by the first columnar body group 36a and the second columnar body group 36b to efficiently transfer the heat having been received from the thermodiffusion aiding member 70 to the whole of the base part 30. Therefore, it is possible to generate the fluorescence Y high in luminance by efficiently releasing the heat from the whole of the radiator fins 31 to thereby further increase the cooling efficiency of the phosphor layer 23.

It should be noted that the scope of the present disclosure is not limited to the embodiments described above, and a variety of modifications can be provided thereto within the scope or the spirit of the present disclosure.

For example, in the embodiments described above, there is cited when the coupling parts 35, 135 are disposed in the outer area R1 and the inner area R2 of the reverse surface 22b of the wheel substrate 22 as an example, but it is possible to dispose the coupling part only in the inner area R2 in the present disclosure.

First Modified Example

A first modified example of the present disclosure will hereinafter be described.

The present modified example is a modified example related to the first embodiment. In the first embodiment, there is cited when the plurality of columnar bodies 36 constituting the coupling part 35 is formed to have the cylindrical shape as an example, but the shape of the columnar bodies is not limited thereto.

Figure 10:
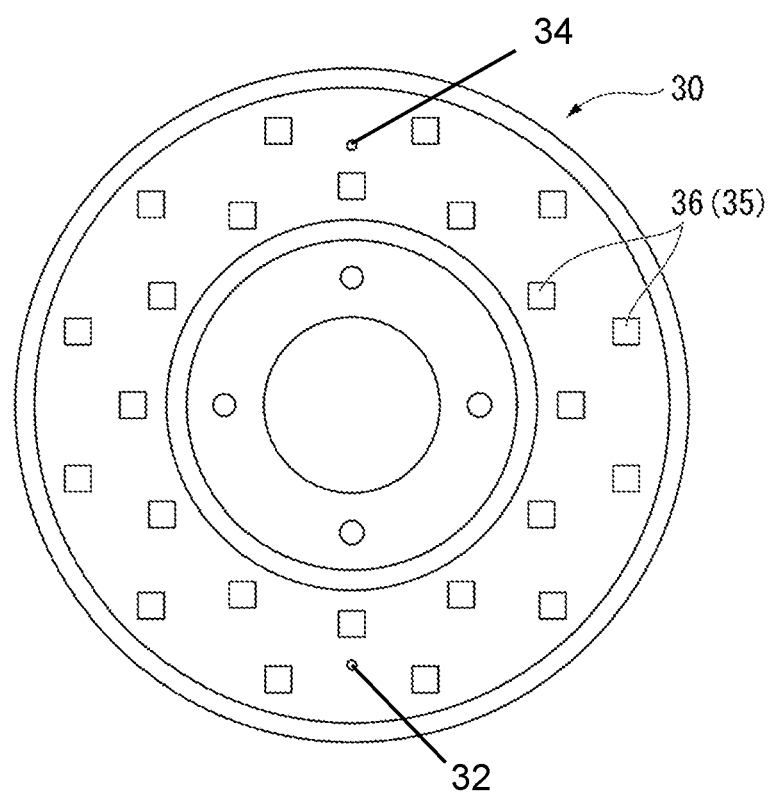
FIG. 10 is a plan view of a wavelength conversion device according to a first modified example viewed from a wheel substrate side.

FIG. 10 is a plan view of a coupling part related to the present modified example.

As shown in FIG. 10, in the present modified example, the plurality of columnar bodies 36 constituting the coupling part 35 can be provided with a prismatic shape such as a quadrangular prismatic shape. It should be noted that the columnar bodies 36 are not limited to the quadrangular prismatic shape, and can be a triangular prismatic shape, a pentagonal prismatic shape, or a polygonal prismatic shape having a planar shape with six or more vertexes. Alternatively, the columnar bodies 36 can be an elliptic cylindrical shape.

Second Modified Example

A second modified example of the present disclosure will hereinafter be described.

The present modified example is a modified example related to the third embodiment. In the third embodiment, there is cited when using the vapor chamber as the thermodiffusion aiding member as an example, but the thermodiffusion aiding member is not limited thereto.

Figure 11:
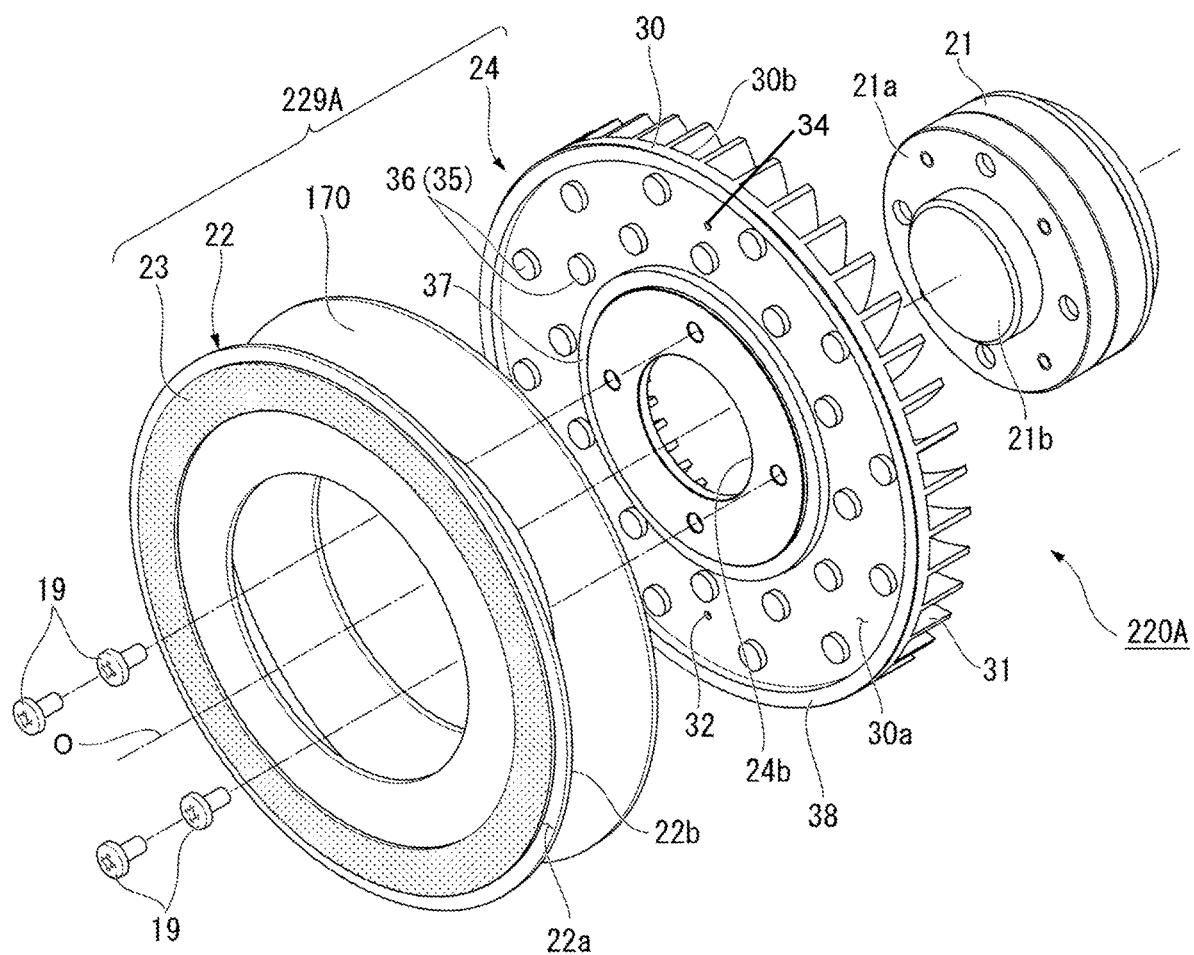
FIG. 11 is a plan view of a wavelength conversion device according to a second modified example viewed from a wheel substrate side.

FIG. 11 is an exploded perspective view of the wavelength conversion device according to the present modified example.

A wavelength conversion device 220A according to the present modified example uses a thermodiffusion aiding member 170 formed of a graphite sheet as the rotating body 229A. The graphite sheet is a sheet obtained by, for example, stacking two-dimensionally crystallized carbon in layers.

Further, in the embodiment described above, there is shown the example in which the projector according to an aspect of the present disclosure is applied to a projector provided with the three light modulation devices, but the projector is not necessarily required to have a plurality of light modulation devices, and can include just one light modulation device.

Besides the above, the specific configurations of the number, the arrangement, the shape, the material, and so on of each of the constituents constituting the projector are not limited to those of the embodiments described above, but can arbitrarily be modified.

It is also possible for the wavelength conversion device according to an aspect of the present disclosure to have the following configuration.

The wavelength conversion device according to an aspect of the present disclosure includes a rotary drive section, a wheel substrate having thermal conductivity and rotated around a central axis by the rotary drive section, a phosphor layer formed around the central axis on a first surface of the wheel substrate, and a cooling fin unit disposed on a second surface opposite to the first surface of the wheel substrate, wherein the cooling fin unit has a base part to be bonded to the wheel substrate, and a plurality of radiator fins disposed at an opposite side to the wheel substrate side of the base part, the second surface of the wheel substrate includes a first area corresponding to the phosphor layer, and a second area located closer to the central axis than the first area, the second surface of the wheel substrate and a surface at the wheel substrate side of the base part are separated from each other to form a space between the wheel substrate and the base part, and a coupling part configured to thermally couple the second surface of the wheel substrate and the surface at the wheel substrate side of the base part is disposed in at least the second area of the second surface.

In the wavelength conversion device according to the aspect of the present disclosure, there may be adopted a configuration in which heat of the phosphor layer propagates to the base part via the space formed between the wheel substrate and the base part.

In the wavelength conversion device according to the aspect of the present disclosure, there may be adopted a configuration in which the coupling part includes a plurality of columnar bodies.

In the wavelength conversion device according to the aspect of the present disclosure, there may be adopted a configuration in which the coupling part includes a first columnar body group constituted by a plurality of first columnar bodies arranged side by side in a circumferential direction around the central axis.

In the wavelength conversion device according to the aspect of the present disclosure, there may be adopted a configuration in which the coupling part includes a second columnar body group constituted by a plurality of second columnar bodies which is arranged at an outer side in a radial direction of the central axis with respect to the first columnar body group, and is arranged side by side in the circumferential direction around the central axis.

In the wavelength conversion device according to the aspect of the present disclosure, there may be adopted a configuration in which the first columnar bodies constituting the first columnar body group and the second columnar bodies constituting the second columnar body group are different in position in the radial direction of the central axis from each other.

In the wavelength conversion device according to the aspect of the present disclosure, there may be adopted a configuration in which the second columnar body group is disposed in the first area corresponding to the phosphor layer on the second surface.

In the wavelength conversion device according to the aspect of the present disclosure, there may be adopted a configuration in which the coupling part includes a plurality of strip bodies radially extending from the second area toward the first area.

In the wavelength conversion device according to the aspect of the present disclosure, there may be adopted a configuration in which the coupling part includes an annular body formed annularly around the central axis.

In the wavelength conversion device according to the aspect of the present disclosure, there may be adopted a configuration in which at least one of the wheel substrate and the base part is bonded to the coupling part with solder.

In the wavelength conversion device according to the aspect of the present disclosure, there may be adopted a configuration in which there is further included an air inflow part configured to make air inflow into the space, and an air outflow part configured to make air outflow from the space.

In the wavelength conversion device according to the aspect of the present disclosure, there may be adopted a configuration in which the air inflow part is disposed in the second area constituting the space, and the air outflow part is disposed in an outer circumference of the space.

In the wavelength conversion device according to the aspect of the present disclosure, there may be adopted a configuration in which the cooling fin unit further includes a thermodiffusion aiding member which intervenes between the wheel substrate and the base part, and is configured to diffuse heat in a plane, and the coupling part receives the heat from the thermodiffusion aiding member.

In the wavelength conversion device according to the aspect of the present disclosure, there may be adopted a configuration in which the thermodiffusion aiding member includes a case which has thermal conductivity, and in which a working fluid changing between a liquid phase and a gas phase with an evaporation section and a condensation section is encapsulated.

In the wavelength conversion device according to the aspect of the present disclosure, there may be adopted a configuration in which the thermodiffusion aiding member is formed of a graphite sheet.

A light source device according to an aspect of the present disclosure may have the following configuration.

The light source device according to another aspect of the present disclosure includes the wavelength conversion device described above, and an excitation light source configured to emit excitation light toward the wavelength conversion device.

A projector according to an aspect of the present disclosure may have the following configuration.

The projector according to an aspect of the present disclosure includes the light source device described above, a light modulation device configured to modulate light from the light source device in accordance with image information, and a projection optical device configured to project the light modulated by the light modulation device.

What is claimed is:

1. A wavelength conversion device comprising:
a rotary drive section;
a wheel substrate having thermal conductivity and rotated around a central axis by the rotary drive section;
a phosphor layer formed around the central axis on a first surface of the wheel substrate; and
a cooling fin unit disposed on a second surface opposite to the first surface of the wheel substrate, wherein
the cooling fin unit has a base part to be bonded to the wheel substrate, and a plurality of radiator fins disposed at an opposite side to the wheel substrate side of the base part,
the second surface of the wheel substrate includes a first area corresponding to the phosphor layer, and a second area located closer to the central axis than the first area,
the second surface of the wheel substrate and a surface at the wheel substrate side of the base part are separated from each other to form a space between the wheel substrate and the base part,
a coupling part configured to thermally couple the second surface of the wheel substrate and the surface at the wheel substrate side of the base part is disposed in at least the second area of the second surface, and
the coupling part is disposed closer to the central axis than the phosphor layer.

2. The wavelength conversion device according to claim 1, wherein
heat of the phosphor layer propagates to the base part via the space formed between the wheel substrate and the base part.

3. The wavelength conversion device according to claim 1, wherein
the coupling part includes a plurality of columnar bodies.

4. The wavelength conversion device according to claim 3, wherein
the coupling part includes a first columnar body group constituted by a plurality of first columnar bodies arranged side by side in a circumferential direction around the central axis.

5. The wavelength conversion device according to claim 4, wherein
the coupling part includes a second columnar body group constituted by a plurality of second columnar bodies which is arranged at an outer side in a radial direction of the central axis with respect to the first columnar body group, and is arranged side by side in the circumferential direction around the central axis.

6. The wavelength conversion device according to claim 5, wherein
the first columnar bodies constituting the first columnar body group and the second columnar bodies constituting the second columnar body group are different in position in the radial direction of the central axis from each other.

7. The wavelength conversion device according to claim 5, wherein
the second columnar body group is disposed in the first area corresponding to the phosphor layer on the second surface.

8. The wavelength conversion device according to claim 1, wherein
the coupling part includes a plurality of strip bodies radially extending from the second area toward the first area.

9. The wavelength conversion device according to claim 1, wherein
the coupling part includes an annular body formed annularly around the central axis.

10. The wavelength conversion device according to claim 1, wherein
at least one of the wheel substrate and the base part is bonded to the coupling part with solder.

11. The wavelength conversion device according to claim 1, further comprising:
an air inflow part configured to make air inflow into the space; and
an air outflow part configured to make air outflow from the space.

12. The wavelength conversion device according to claim 11, wherein
the air inflow part is disposed in the second area constituting the space, and
the air outflow part is disposed in an outer circumference of the space.

13. The wavelength conversion device according to claim 1, wherein
the cooling fin unit further includes a thermodiffusion aiding member which intervenes between the wheel substrate and the base part, and is configured to diffuse heat in a plane, and
the coupling part receives the heat from the thermodiffusion aiding member.

14. The wavelength conversion device according to claim 13, wherein
the thermodiffusion aiding member includes a case which has thermal conductivity, and in which a working fluid changing between a liquid phase and a gas phase with an evaporation section and a condensation section is encapsulated.

15. The wavelength conversion device according to claim 13, wherein the thermodiffusion aiding member is formed of a graphite sheet.

16. A light source device comprising:
the wavelength conversion device according to claim 1; and
an excitation light source configured to emit excitation light toward the wavelength conversion device.

17. A projector comprising:
the light source device according to claim 16;
a light modulation device configured to modulate light from the light source device in accordance with image information; and
a projection optical device configured to project the light modulated by the light modulation device.

18. A wavelength conversion device comprising:
a rotary drive section;
a wheel substrate having thermal conductivity and rotated around a central axis by the rotary drive section;
a phosphor layer formed around the central axis on a first surface of the wheel substrate; and
a cooling fin unit disposed on a second surface opposite to the first surface of the wheel substrate, wherein
the cooling fin unit has a base part to be bonded to the wheel substrate, and a plurality of radiator fins disposed at an opposite side to the wheel substrate side of the base part, the second surface of the wheel substrate includes a first area corresponding to the phosphor layer, and a second area located on closer to the central axis than the first area, the second surface of the wheel substrate and a surface at the wheel substrate side of the base part are separated from each other to form a space between the wheel substrate and the base part, a coupling part configured to thermally couple the second surface of the wheel substrate and the surface at the wheel substrate side of the base part is disposed in at least the second area of the second surface, and the second area is located on a same plane as a first plane on which the first area is located.

19. The wavelength conversion device according to claim 18, wherein the base part thermally couples to a part of the second area via the coupling part, and the base part faces and is separated from another part located around the part of the second area.

20. A wavelength conversion device comprising:

a rotary drive section;

a wheel substrate having thermal conductivity and rotated around a central axis by the rotary drive section;

a phosphor layer formed around the central axis on a first surface of the wheel substrate; and a cooling fin unit disposed on a second surface opposite to the first surface of the wheel substrate, wherein the cooling fin unit has a base part to be bonded to the wheel substrate, and a plurality of radiator fins disposed at an opposite side to the wheel substrate side of the base part, the second surface of the wheel substrate includes a first area corresponding to the phosphor layer, and a second area located closer to the central axis than the first area, the second surface of the wheel substrate and a surface at the wheel substrate side of the base part are separated from each other to form a space between the wheel substrate and the base part, a coupling part configured to thermally couple the second surface of the wheel substrate and the surface at the wheel substrate side of the base part is disposed in at least the second area of the second surface, the cooling fin unit further includes a thermodiffusion aiding member which intervenes between the wheel substrate and the base part, and is configured to diffuse heat in a plane, and the coupling part receives the heat from the thermodiffusion aiding member.

* * * * *